Dec. 2, 1969  R. T. GAMMONS  3,480,979
METHOD OF ATTACHING CLEATS TO SHOE BOTTOMS
Filed June 3, 1968

United States Patent Office 3,480,979
Patented Dec. 2, 1969

3,480,979
METHOD OF ATTACHING CLEATS
TO SHOE BOTTOMS
Robert T. Gammons, Natick, Mass., assignor to E. T. Wright & Co., Inc., Rockland, Mass., a corporation of Massachusetts
Filed June 3, 1968, Ser. No. 734,154
Int. Cl. A43d 9/00, 11/00
U.S. Cl. 12—142                                23 Claims

ABSTRACT OF THE DISCLOSURE

The method of attaching cleats to the bottoms of shoes which comprises holding a plurality of cleats, each having a head, a shank stemming therefrom, and a tapered tip, with their heads close to the bottom of the lasted upper, forming a first layer of dense plastisol against the bottom about the heads, and after the dense plastisol layer sets forming a second layer of a less dense plastisol against the first layer of a thickness such as to leave the tapered portions of the cleats extending therefrom.

Background of the invention

In the pending applications of Bernier et al. Ser. No. 710,973, filed Mar. 6, 1968 and Ser. No. 727,819, filed May 9, 1968, there is disclosed a method of attaching cleats to the bottoms of shoes in which a relatively stiff insert corresponding substantially in shape to the bottom of the shoe in which it is to be incorporated is formed by an injection molding process with a plurality of cleats secured to it by embedding the heads of the cleats in bosses formed integral with one side of the insert. The cleats disclosed in the earlier of the applications are comprised of a dense plastisol and the cleats disclosed in the later application are comprised of metal, specifically a relatively soft steel containing at their tapered ends a very hard, high, wear-resistant material such as tungsten. In each of the applications the insert is preformed and then placed between the bottom of a lasted upper and a preformed outsole and the latter attached in conventional fashion to the upper, for example, to a welt, or is attached to the lasted upper by supporting it in a mold cavity below the lasted upper and injecting a plastisol into the mold around it against the bottom to form an outsole containing the insert. This invention relates to still another way of attaching cleats of the foregoing kind to the bottoms of shoes and particularly without preforming an insert such as described in the above applications.

Summary

In accordance with this invention a plurality of cleats, each embodying a head, a cylindrical shank stemming therefrom, and a tapered tip are supported with their heads adjacent the bottom of a lasted upper whereupon a first layer of dense plastisol is formed against the bottom of the upper of such thickness as toe encompass the heads of the cleats. The layer of dense plastisol is allowed to set and then a second layer of a less dense plastisol is formed against the first layer of such thickness as to leave the tapered portions of the cleats extending therefrom. According to one method of manufacture the dense layer extends all the way to the edge of the bottom and according to another way of manufacture the dense layer is made appreciably smaller in overall area than the bottom and the second layer is formed against the first layer and the portion of the upper marginally thereof. Preferably the first layer is formed with bosses at its lower side for receiving the heads of the cleats.

Optionally a preformed outsole may be employed with the cleats set thereinto with the heads extending from the inner side and the tapered ends extending from the outer side. The sole with the cleats thus mounted is supported adjacent the bottom of the lasted upper and a layer of dense plastisol is formed between the bottom of the upper and the inner surface of the outsole. A re-entrant groove may be routed in the inner surface of the outsole prior to attachment to provide an interlock between the dense layer and the outsole. The cleats may be fixed in the outsole by driving them through the outsole or by forming holes of smaller diameter than the cleats in the outsole and forcing the cleats into the holes. Preferably the inner surface of the preformed outsole is provided with recesses of larger diameter than the heads of the cleats for receiving the cleats so that when the plastisol is injected between the lower surface of the lasted upper and the inner surface of the outsole it will flow into the recesses about the heads of the cleats.

The method is carried out with an open top mold assembly comprising a mold ring and sole plate, the latter containing holes for receiving the cleats and comprises raising the sole plate to a position close to the lower side of the lasted upper and injecting a dense plastisol into the cavity between the bottom of the upper and the upper side of the sole plate around the heads of the cleats. Optionally the molding apparatus may include a bottom ring which is initially placed against the bottom of the last so that the first layer of dense plastisol is smaller in area than the bottom of the upper and then lowering the bottom ring to the same level as the sole plate during the second injection so that the second layer covers the bottom and edge surfaces of the first layer. If a preformed outsole is to be employed it is placed on the sole plate and the plastisol injected between the lower surface of the lasted upper and the inner side of the preformed sole.

The invention will now be described in greater detail with reference to the accompanying drawings wherein:

FIG. 1a is a fragmentary section of the sole plate showing a sealing washer placed about the shank of a cleat;

Figure 3:
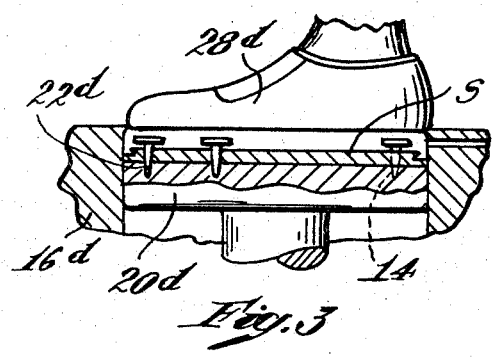
Figure 7:
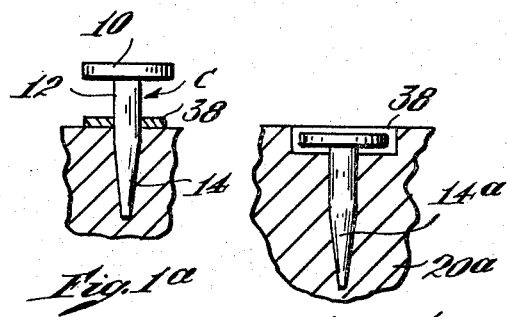
Figure 7:
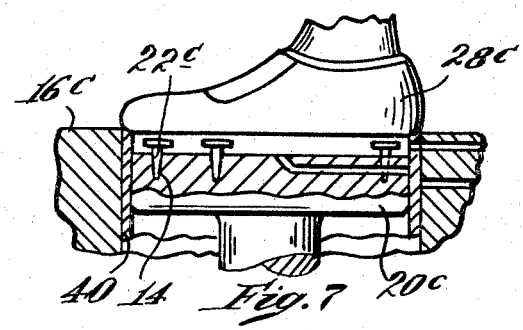
Figure 6:
Figure 4:
Figure 5:
Figure 8:
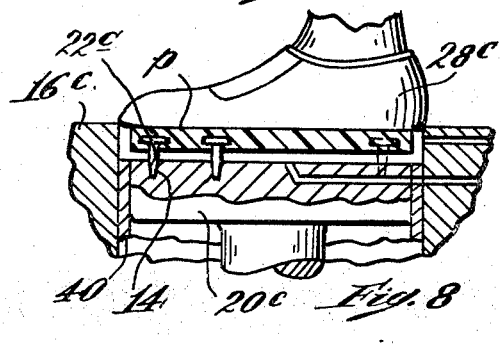

FIG. 3 is an elevation of a mold assembly with the lasted upper resting against the open top of the mold and a preformed outsole in which the cleats have been positioned resting on the sole plate with the heads of the cleats adjacent but spaced from the bottom of the lasted upper preparatory to making an injection of a dense plastisol between the bottom of the lasted upper and the inner side of the preformed outsole;

FIG. 4 is a fragmentary section of a preformed outsole with a re-entrant groove partly in its edge face and partly in its inner face;

FIG. 5 is a fragmentary section of a preformed outsole with a re-entrant groove in its inner face;

FIG. 6 is a fragmentary section of a preformed outsole with a recess and hole at its center for receiving the head and shank portion of a cleat;

FIG. 7 is an elevation of a mold assembly including a bottom ring with the bottom ring engaged with the lower side of the lasted upper and with the sole plate raised to position the heads of the cleats close to but spaced from the bottom side of a lasted upper; and FIG. 8 is an elevation corresponding to FIG. 7, after the first injection has been made, and with the bottom ring and sole plate lowered preparatory to making the second injection.

In accordance with this invention the cleats c, each of which comprises a circular head 10, a cylindrical shank 12 stemming therefrom, and a tapering tip 14 containing an insert of a hard material such as tungsten as disclosed in the aforesaid application Ser. No. 727,819, filed May 9, 1968, are incorporated in the bottom of the shoe without first attaching them to an insert.

A conventional mold assembly (FIGS. 1 and 2) comprising a side ring 16 provided with a lip 18 and a sole plate 20, the latter being modified to the extent of providing its upper surface with a plurality of holes 22 for receiving the cleats, is used in carrying out the method. The holes 22 are formed or drilled into the sole plate to a sufficient depth to receive the cylindrical and tapering portions of the cleats and to support them with their heads above the surface. The holes 22 are of a size to provide a close fit with the cylindrical portions of the cleats but not so tight as not to allow the cleats to be withdrawn.

Figure 1:
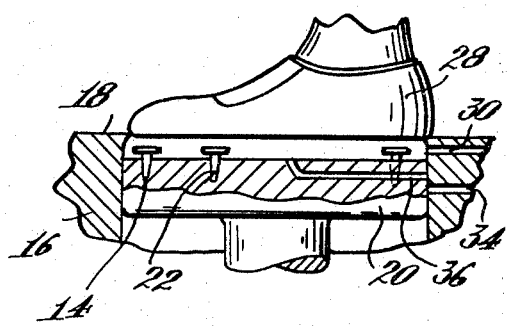
FIG. 1 is an elevation, partly in section, showing a lasted upper resting against the top of an open top mold assembly with the sole plate supporting a plurality of cleats with their heads closely adjacent but spaced from the bottom of a lasted upper preparatory to making a first injection of a dense plastisol.
Figure 2:
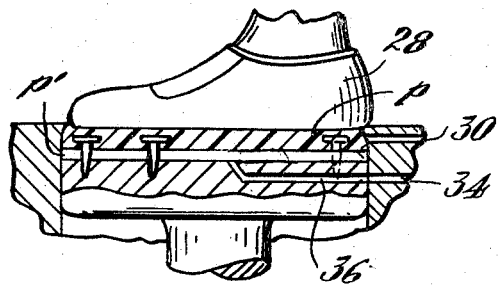
FIG. 2 is a view corresponding to FIG. 1 after the first injection of plastisol has been made about the heads of the cleats with the sole plate lowered and showing a second injection of a less dense plastisol between the first layer and the lowered sole plate.

In carrying out the invention in one form the sole plate 20 is raised to a position such, for example, as shown in FIG. 1, so that the heads 10 of the cleats are close to but spaced from the underside of a lasted upper 28 resting at the top of the side ring whereupon a first layer of dense plastisol p is injected into the cavity between the lower side of the lasted upper and the upper surface of the sole plate through an injection opening 30 to fill the cavity and to surround the heads of the cleats. The plastisol is allowed to set and then the sole plate is lowered to a position such as shown in FIG. 2. Since the heads of the cleats are firmly anchored in the first layer of dense plastisol lowering of the sole plate will withdrawn the cleats part way from the holes 14, leaving enough of the cylindrical portions in the holes to maintain a seal and the tapered portions still in the holes. The sole plate as thus lowered provides a cavity between the lower surface of the first layer of plastisol and the upper surface of the sole plate around the cylindrical portions of the cleats. A second layer of plastisol p' of a lesser density is now injected into the cavity through an injection opening 34 provided in the side ring and through a registering passage 36 in the sole plate itself. When the second layer of plastisol has set the sole plate is further lowered to disengage it from the tapered portions of the cleats and the finished shoe is removed from the mold. Preferably the side ring is split longitudinally in accordance with customary practice and provided with means for moving the halves away from each other to enable removing the shoe without difficulty.

If a close enough tolerance between the shank of the cleats and the holes in the sole plate cannot be maintained or through wear the holes become enlarged so that some of the plastisol first injected would be forced into the holes around the cylindrical portions of the cleats and thus make it difficult to withdraw the sole plate for the second injection, a sealing ring 38 (FIG. 1a) may be placed about the cylindrical portion of each cleat where it enters the sole plate so that during the injection the pressure of the injected plastisol will press the ring firmly about the cylindrical portions of the cleats and prevent flow of plastisol into the hole 22. A thin felt or paper washer may be used for this purpose.

As pointed out above, the first layer p is comprised of a dense plastisol, preferably a material such that when it sets up forms a layer comparable to the inserts disclosed in the aforesaid applications which are firm and dimensionally stable and yet flexible. The second layer p' is comprised of a less dense plastisol and preferably of an expanded plastisol which will provide a cushion layer upon which to walk.

Figure 2A:
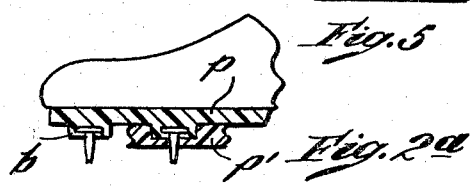
FIG. 2a is a fragmentary elevation of a shoe showing a bottom partly in section provided with bosses for containing the heads of the cleats.

As shown in FIGS. 1 and 2 the heads of the cleats are embedded in a uniformly thick layer of plastisol applied to the bottom of the lasted upper. The preferred practice is to form this first injected layer with bosses b on its lower side, as shown in FIG. 2a, for receiving the heads of the cleats in the same manner as bosses were provided on the underside of the inserts as shown in the aforesaid pending applications. To achieve this two sole plates are provided alternately useable with a single mold ring 16, to wit, a sole plate 20a, such as shown in FIG. 2b, containing recesses 38 corresponding in diameter and depth to the bosses to be formed on the lower side of the first layer and holes 22a, and a sole plate 20, such as shown in FIGS. 1 and 2, with a flat surface containing holes 22 for receiving the shank and tapered portions of the cleats extending from the bosses after the first layer has been formed. Molding apparatus in which alternately useable sole plates are employed are not new nor difficult to use.

The first layer p in which the heads of the cleats are embedded, or a first layer provided with bosses for containing the heads of the cleats, as shown in FIGS. 1, 2 and 2b, extend all the way to the peripheral edge of the lasted upper. It may be desirable to make the first layer of smaller area, leaving a portion of the bottom of the lasted upper exposed peripherally thereof so that when the second layer is applied it will cover not only the lower surface of the first layer but the peripheral edge of the first layer and the uncovered marginal portion of the upper.

FIGS. 7 and 8 show a mold assembly by means of which a bottom structure of this kind may be formed comprising a side ring 16c, a sole plate 20c of smaller area than the bottom of the lasted upper, and a bottom ring 40 situated between the side ring 16c and the sole plate 20c. The sole plate, like that described above, contains holes 22c for receiving the cleats. In using the apparatus shown in FIGS. 7 and 8, the bottom ring 40, as shown in FIG. 7, is first raised into engagement with the underside of the lasted upper 28c, then the sole plate 20c is raised with the cleats set into it to a position in which the heads of the cleats are close to but spaced from the botom side of he lasted upper 28c and then a dense plastisol is injected into the cavity around the heads of the cleats. The sole plate 20c is now drawn down to the position shown in FIG. 8 without withdrawing the tapered portions of the cleats from the holes and the bottom ring 40 is drawn down to a corresponding level so as to provide a cavity between the first injected layer and the upper surfaces of the sole plate and bottom ring whereupon a plastisol of lesser density is injected into the cavity to form a second layer p' against the lower surface of the first formed layer and against the exposed marignal portion of the upper peripherally thereof.

As previously indicated, it is desirable to have bosses at the lower side of the first layer for containing the heads of the cleats and hence alternate sole plates may be employed with a bottom ring in the same manner as described above.

The second layer may be introduced into the mold in an expanded condition in which case the sole plate will be positioned at a distance from the first layer corresponding to the exact thickness desired, or it may be introduced in an unexpanded condition containing a latent expanding agent and the sole plate lowered as expansion takes place so as to accurately control the thickness of the layer and/or the porosity of the layer. By delaying expansion for a short period of time prior to lowering the sole plate a dense skin may be formed over the entire tread surface and the peripheral edge which will prevent penetration of moisture and dirt into the interior of pores which are in direct communication with the surface.

As illustrated the first and second layers are shown substantially uniformly thick from toe to heel; however, it is to be understood that the sole plate, in accordance with customary practice, may be contoured to provide at the heel end an elevated heel and when this is done the cleats for incorporation in the heel will be made sufficiently long to extend clear through the elevated heel to the exterior.

In all instances whether at the forepart or heel the heads of the cleats are preferably scalloped as shown in the aforesaid pending application Ser. No. 727,819 to prevent rotation.

It is also within the scope of the invention to incorporate the cleats by injecting an unexpanded plastisol containing a latent foaming agent into the mold with the sole plate raised to hold the layer under sufficient pressure to prevent expansion until a dense layer sets adjacent the bottom of the lasted upper around the heads of the cleats and then to lower the sole plate and allow the remainder of the plastisol to expand to form a cushion layer.

Shoes made according to the method described above have soles which are comprised entirely of plastisol. Optionally a preformed leather outsole S may be used, as shown in FIG. 3, into which the cleats have previously been inserted. The leather outsole S is placed on the upper surface of the sole plate 20d and is raised within the side ring 16d to a level such that the heads of the cleats are close to but spaced from the lower surface of the lasted upper 28d whereupon a dense plastisol is injected into the cavity between the lower surface of the upper and the inner surface of the leather outsole. To provide for a firm inseparable junction between the plastisol and the leather outsole the leather outsole may have a re-entrant groove 44 formed partly in its edge face and partly in its inner surface, as shown in FIG. 4, or a re-entrant groove 46 formed in its inner surface, as shown in FIG. 5, in which the plastisol will flow and form an interlock.

The cleats c may be driven through the preformed leather outsole without previously making recesses or holes for receiving them or recesses r and holes h may be preformed in the outsole as shown in FIG. 6—the recesses being larger than the heads of the cleats and the holes smaller than the shanks of the cleats. By using a suitable supporting die for the outsole the cleats may be accurately set into the holes so that the heads are situated in the recesses and the tapered ends extend the proper distance from the outer surface. In this case the holes 22d in the sole plate need only to be deep enough to receive the projecting portions of the cleats at the outer surface of the preformed outsole. The recesses r in the outsole permit the plastisol to flow about the heads of the cleats.

The term plastisol as used herein is intended to embrace any and all materials whether natural or man-made which, by suitable treatment, may be made plastic to permit forming under pressure and/or heat to the desired shape and may thereafter be caused to set to form a dimensionally stable structure and which provide the properties required for the use described above.

It should be understood that the present disclosure is for the purpose of illustration only and that this invention includes all modifications obvious to a person skilled in the art.

I claim:

1. The method of attaching cleats to shoe bottoms, each cleat embodying a head, a cylindrical shank stemming therefrom, and a tapered tip; comprising supporting the cleats with their heads adjacent the bottom of a lasted upper, forming a first layer of dense plastisol against the bottom of the upper of such thickness as to encompass said heads, allowing the plastisol to set and then forming a second layer of a less dense plastisol against the first layer of a thickness such as to leave the tapered tips extending therefrom.

2. A method according to claim 1, comprising forming said first layer of plastisol over an area which is smaller than the overall area of the bottom of the lasted upper, leaving the margin of the bottom uncovered, and forming the second layer against the first layer and said uncovered portion of the upper marginally thereof.

3. The method of attaching cleats to shoe bottoms, each cleat embodying a head, a cylindrical shank stemming therefrom, and a tapered tip; comprising supporting an outsole with the cleats set into it with their heads extending from the inner sides and their tapered tips extending from the outer sides, adjacent the bottom of a lasted upper, and forming a first layer of dense plastisol between the bottom of the lasted upper and the inner side of the outsole to envelop the heads of the cleats and join the outsole to the bottom of the lasted upper.

4. A method according to claim 3, comprising providing at the edge face of the outsole a re-entrant groove open from the inner side of the outsole.

5. The method of attaching cleats to shoe bottoms, each cleat embodying a head, a cylindrical shank stemming therefrom, and a tapered tip; comprising supporting the cleats with their heads adjacent the bottom of a lasted upper, confining a body of plastisol containing a latent foaming agent against the bottom of the lasted upper about the heads of the cleats, under a pressure such as to prevent expansion of the plastisol until a dense layer is formed about the heads, and then allowing the remainder of the body of plastisol to expand to form a second layer of a thickness to leave the tapered portion of the cleats exposed.

6. A method according to claim 3, comprising routing a re-entrant groove in the inner surface of the preformed outsole adjacent the edge.

7. A method according to claim 3, comprising driving the cleats through the preformed outsole to position the tapered portions at the outer side thereof and the heads at the inner side thereof.

8. A method according to claim 3, comprising preforming holes in the preformed outsole of smaller diameter than the cleats and forcing the cleats into the holes to position the tapered portions at the outer side and the heads at the inner side.

9. A method according to claim 3, comprising placing a sealing element around each cleat at the inner side of the outer sole where the cleat enters the outer sole.

10. The method of attaching cleats to shoe bottoms, each cleat embodying a head, a cylindrical shank stemming therefrom, and a tapered tip; comprising holding a lasted upper against the open top of an open top mold assembly embodying a side ring and sole plate, the latter containing holes in its upper surface for receiving the cleats and supporting them in upright positions, raising the sole plate in the ring to position the heads of the cleats close to but spaced from the bottom of the lasted upper, injecting a first layer of dense plastisol, allowing the dense plastisol to set, lowering the sole plate to provide a cavity below the first injected layer and the sole plate without withdrawing the tapered portions of the cleats from the sole plate, and injecting a second layer of less dense plastisol into the cavity between the first injected layer and the lowered sole plate.

11. The method according to claim 10, comprising injecting an expanded plastisol into the cavity between the first injected layer and the lowered sole plate.

12. The method according to claim 10, comprising mounting a preformed outsole on the sole plate within the mold cavity into which the cleats have been previously inserted with the tapered ends extending from the outer surface into the holes in the sole plate and with the heads extending from the inner surface of the sole, raising the sole plate to position the heads of the cleats close to but spaced from the lower surface of the lasted upper and injecting a dense layer of plastisol into the cavity between the lower side of the lasted upper and the inner surface of the preformed outsole.

13. A method according to claim 12, comprising driving the cleats through the outsole to position the tapered ends at the outer side and the heads at the inner side.

14. A method according to claim 12, comprising preforming holes in the preformed outsole and forcing the cleats through said holes to position the tapered ends at the outer side and the heads at the inner side.

15. A method according to claim 12, comprising routing the inner surface of the preformed outsole to provide a re-entrant groove for receiving the plastisol injected between the bottom of the lasted upper and the inner surface of the outsole to form an interlock.

16. A method according to claim 10, comprising employing a sole plate of smaller area than the side ring and a bottom ring interposed between the sole plate and side ring, raising the bottom ring into engagement with the bottom of the lasted upper and the sole plate to position the heads of the cleats close to but spaced from the bottom of the lasted upper, injecting a first dense layer of plastisol about the heads of the cleats, lowering the sole plate to provide a cavity between the first injected layer and the sole plate without withdrawing the tapered portions of the cleats from the holes, lowering the bottom ring to a level corresponding to that of the sole plate and injecting a second layer of less dense plastisol between the first formed layer and the lowered sole plate.

17. The method of attaching cleats to the bottoms of shoes which comprises holding a plurality of cleats, each having a head, a shank stemming therefrom, and a tapered tip, with the heads close to but spaced from the bottom of the lasted upper, forming a body of dense plastisol against the bottom of the lasted upper comprising a substantially uniformly thick layer between the bottom and the heads of the cleats having at its lower side protrusions corresponding in number to the number of the cleats and of such additional thickness as to envelop the heads of the cleats, said layer and its protrusions being comprised of a dense plastisol, allowing the dense plastisol to set and then forming a second layer against the lower side of the dense layer and about the protrusions thereon, said second layer being comprised of a less dense plastisol and of such thickness as to leave the tapered portions of the cleats extending from its lower side.

18. The method according to claim 17, wherein said second layer is comprised of an expanded plastisol.

19. The method according to claim 17, wherein said dense layer is smaller in area than the bottom of the lasted upper, leaving a portion of the bottom of the upper marginally thereof uncovered, and the second layer covers the lower side of the dense layer and the uncovered bottom of the lasted upper marginally thereof.

20. The method of attaching cleats to the bottom of shoes wherein each cleat has a head, a shank stemming therefrom and a tapered tip, which comprises supporting a preformed outer sole containing at its inner side a plurality of recesses corresponding in number to the heads of the cleats and holes at the centers thereof, said recess being larger than the heads of the cleats and the holes being smaller than the shanks, and the cleats being fixed in the outer sole with the heads situated in the recesses and the tapered portions extending from the lower side, and forming between the bottom of the lasted upper and the inner side of the preformed outer sole a layer of dense plastisol.

21. The method according to claim 19, comprising providing the inner surface of the preformed outsole with a peripheral re-entrant groove.

22. The method of attaching cleats to bottoms of shoes, said cleats each having a head, a shank stemming therefrom, and a tapered tip; comprising providing a mold assembly embodying a side ring and alternately useable sole plates, one of which has a plurality of recesses in its upper surface of larger diameter than the heads of the cleats and holes at their centers into which the shanks and tapered portions of the cleats extend and support the cleats with the heads in the recesses, and the other of which has a plurality of holes for receiving the shanks and tapered portions of the cleats, mounting the cleats on the first sole plate with the heads situated in the recesses, raising the sole plate to a position close to but spaced from the bottom of the lasted upper, filling the cavity between the bottom of the lasted upper and the first sole plate including the recesses in which the heads of the cleats are situated with a first layer of dense plastisol, allowing the first layer to set, removing the first sole plate and replacing it with the second sole plate, moving the second sole plate up to a level such as to receive the tapered portions of the cleats in the holes in its surface and filling the cavity between said first layer and the second sole plate.

23. The method according to claim 22, comprising employing a mold assembly in which the first sole plate is smaller than the bottom of the lasted upper and wherein a bottom ring is interposed between the side ring and the first sole plate, raising the bottom ring into engagement with the bottom of the lasted upper when filling the cavity between the bottom of the lasted upper and the first sole plate, and lowering the bottom ring to the level of the second sole plate when filling the cavity between the first layer and the second sole plate.

References Cited

UNITED STATES PATENTS 3,187,073   6/1965   Bingham      12—142 X
3,327,412   6/1967   Wilmanns et al.      36—59

PATRICK D. LAWSON, Primary Examiner